June 11, 1946. E. LABIN 2,401,939
APERIODIC PHASE INVERTER
Filed Sept. 16, 1943
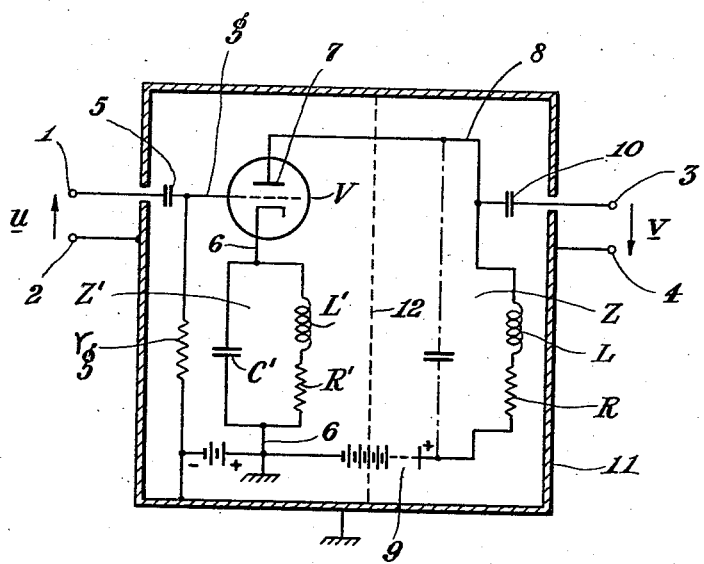
EDOUARD LABIN
INVENTOR.
BY
ATTORNEY Patented June 11, 1946

2,401,939

UNITED STATES PATENT OFFICE 2,401,939

APERIODIC PHASE INVERTER

Edouard Labin, Buenos Aires, Argentina, assignor to Hartford National Bank and Trust Company, Hartford, Conn., as trustee Application September 16, 1943, Serial No. 502,696

3 Claims. (Cl. 178—44)

The present invention relates to a phase inversion circuit, and more particularly to an aperiodic phase-inverter.

Phase inversion, i. e. the generation of two oscillations of the same frequency and amplitude but of opposite phases, is widely used in electronics, especially for exciting push-pull audio-amplifiers or transmitters, where the most common expedient used to provide the necessary phase inversion is the so-called push-pull transformer.

However, due to the constructional features of such transformer and particularly due to the distributed capacitances of the transformer coils, phase inversion by means of transformers is limited to the lower frequency range where in fact, an inversion of 180° can only be obtained by a careful adjustment of the transformer constants and for a very limited range of frequencies. For frequencies higher than 1 mc./s., the disadvantages of the push-pull transformers are even more pronounced, and it may be stated that the problem of the aperiodic phase inversion has as set not been resolved.

The present invention provides a simple and effective circuit for obtaining a perfect phase inversion, independently of the frequency and with a unity change in amplitude, by using a negative feedback circuit comprising a thermionic valve having inserted in its cathode lead an impedance constituted by a parallel circuit, and provided with a further impedance inserted in the plate circuit of said valve. By designing the constant of said negative feedback circuit so that the total plate impedance is approximately equal to the sum of the cathode impedance and the inverse of the transconductance of the valve, the voltage generated in the plate circuit of said valve has, in a wide band of frequencies, exactly the same amplitude but is of opposite phase, relative to the oscillation injected in the grid circuit of the thermionic valve.

Therefore, the main object of the invention is to provide a circuit which will exactly invert the phase of an oscillation independently from the frequency.

A further object of the invention is to provide a phase-inverter which will not modify the amplitude of the original oscillation.

A still further object of the invention is to obtain a phase-inverter which will not require any adjustments and which will effectively invert the phase of high frequency oscillations over a wide band of frequencies.

Other objects and advantages of the invention will become apparent from the course of the following description, when read in conjunction with the accompanying drawing, which illustrates, by way of example, a preferred embodiment of the invention and wherein the single figure shows a phase-inverter circuit.

Referring to the drawing, it may be seen that same shows a negative feed-back circuit, the input terminals 1 and 2 of which are connected to the grid circuit of a thermionic valve V, while the output terminals 3 and 4 of the phase-inverter are derived from the load circuit of said thermionic valve V.

Grid $g$ of thermionic valve V comprises a grid leak resistance $r_g$ and a coupling condenser 5, while its cathode lead 6 has inserted a parallel resonance circuit having an impedance $Z'$ and being constituted by the series connected inductance $L'$ and resistance $R'$ shunted by a condenser $C'$.

Plate 7 of thermionic valve V is connected through conductor 8 to a series combination of inductance L and resistance R, which are normally shunted by the natural output capacity C of the complete connections including the plate-cathode capacity of the valve, thus constituting a parallel circuit of impedance Z whose other end is connected to a direct current supply 9.

Output terminal 3 is coupled to anode 7 of said valve V through coupling condenser 10, while terminal 4 is connected to metallic casing 11 of the phase-inverter, which is connected to ground potential and which is provided with an internal shield 12, separating the cathode and anode impedances $Z'$ and Z respectively.

The valve is represented as a triode for mere simplification purposes, but it can be, and will effectively be in practice, of the multi-electrode type.

On applying an alternating voltage $u$ to the grid-ground terminals of the tube V, the voltage generated across load impedance Z can be derived as follows hereinafter, assuming that the internal resistance of the tube is substantially higher than Z and that the operating conditions of the tube are linear.

Tube V can be regarded as a constant-current generator generating a current $i = S.v_g$, where $S$ is the transconductance of the tube V and $v_g$ is the voltage present between the control grid and cathode. Now due to cathode feedback $v_g = u - i.Z'$ since the current $i$ flows also through cathode impedance $Z'$. Hence $$i = S.(u - i.Z') = S.u - i.SZ'$$

or $$i = \frac{S.u}{1 + SZ'}$$

Since $$v = -Z.i$$

(assuming that $i$ flows from the load impedance Z toward the anode of tube V and that for the estimation of $v$ the extreme of load impedance Z connected to this anode is taken as the positive point with respect to its other extreme), the output voltage present across load impedance Z can be written $$v = \frac{-S.Z}{1 + SZ'}.u$$

it is therefore possible to obtain an ouput voltage $v = -u$, that is to say, a voltage of the same amplitude as $u$ but of opposite phase, by simply choosing the circuit parameters so that $$Z - Z' = 1/S$$

or, if the inverse value of the transconductance S may be termed the transresistance $T_r$ of the thermionic valve V, then the impedance Z of the anode circuit of valve V should be equal to the sum of the cathode impedance and said transresistance $T_r$.

Due to the fact that impedances Z and Z' contain both real and imaginary components, the above mentioned condition is possible in a mathematically rigorous sense for one frequency only. However, I have found it possible to obtain a very good maintenance of said relation over a wide band of frequencies by designing the load and cathode impedances so that their resonant frequencies $f_1$ and $f_2$ respectively, will be at least 3.2 times higher than the highest frequency which will pass through the phase-inverter, and realizing the constructional relations $$R^2 = \frac{2L}{C}, R'^2 = \frac{2L'}{C'}$$

If we choose further $L = L'$ and, finally, make resistance R in the load circuit equal to the sum of resistance R' in the cathode circuit and the transresistance $T_r$ of valve V, which it is possible to obtain exactly because it deals with three pure real magnitudes, then the amplification factor of the circuit will be equal to $-1$ up to said highest frequency, with an exactitude of more than 1% in amplitude and ½ a degree in phase.

When designing the phase-inverter circuit, it is advisable to start from the value of condenser C which is limited by the valve capacities, and from the fact that $f_2$, or the resonance frequency of the cathode circuit, should be equal to 3.2 times $\omega_{max}$, where $\omega_{max}$ represents the highest frequency which we will pass through the phase-inverter. Using a conservative value of C of 17µµF and limiting the highest frequency for instance to $\omega_{max} = 5$ mc./s., the transconductance required for valve V is equal to 4.5 ma./v., a value which may be easily obtained with valves used for television.

It is evident that several modifications and changes in construction and details may occur to those skilled in the art, without departing from the scope of the invention as clearly set forth in the appended claims.

I claim:

1. An aperiodic phase inverter comprising a discharge tube having a cathode, a control grid and an anode, an impedance connected to the cathode and forming part of the grid to cathode and plate to cathode circuits of the tube, and a load impedance connected between the anode of tube and said cathode impedance, said cathode impedance and said anode impedance each comprising an inductive branch having a resistance component and a capacitive branch in shunt with said inductive branch, said load impedance having a value substantially equal to the sum of the said cathode impedance and the transresistance of the tube to produce across said load impedance an output voltage substantially equal in magnitude and opposite in phase to an input voltage applied to said control grid.

2. An aperiodic phase inverter for producing over a predetermined frequency range, an output voltage substantially equal in amplitude and opposite in phase to an input voltage applied thereto, comprising a thermionic discharge tube having a cathode, a control grid and an anode, an impedance connected to the cathode and forming part of the grid to cathode and plate to cathode circuits of the tube, and a load impedance connected between the anode of the tube and said cathode impedance, said cathode impedance comprising an inductor element and a resistor element connected in series and a capacitor element connected across said inductor and resistor, said load impedance comprising an inductor element and a resistor element connected in series, and a capacitor element connected across said inductor and resistor, the inductor element of said cathode impedance and the load impedance being substantially equal in value, the constants of the cathode impedance and the load impedance having the relationships $$R^2 = \frac{2L}{C} \text{ and } R'^2 = \frac{2L'}{C'}$$

respectively, where R and R' are the values of the resistor elements of the cathode impedance and load impedance respectively, L and L' the values of the inductor elements and C and C' the values of the respective capacitor elements, and the resistor element of the load impedance having a value substantially equal to the sum of the values of the resistor element of the cathode impedance and the transresistance of the tube, the load impedance circuit having a resonant frequency value approximately equal to 3.2 times the maximum frequency of said predetermined frequency range.

3. An aperiodic phase inverter for producing over a predetermined frequency range, an output voltage substantially equal in amplitude and opposite in phase to an input voltage applied thereto, comprising a thermionic discharge tube having a cathode, a control grid and an anode, an impedance connected to the cathode and forming part of the grid to cathode and plate to cathode circuits of the tube, and a load impedance connected between the anode of the tube and said cathode impedance, said cathode impedance comprising an inductor element and a resistor element connected in series and a capacitor element connected across said inductor and resistor, said load impedance comprising an inductor element and a resistor element connected in series, and a capacitor element connected across said inductor and resistor, the inductor element of said cathode impedance and the load impedance being substantially equal in value, the constants of the cathode impedance and the load impedance having the relationships $$R^2 = \frac{2L}{C} \text{ and } R'^2 = \frac{2L'}{C'}$$

respectively, where $R$ and $R'$ are the values of the resistor elements of the cathode impedance and load impedance respectively, $L$ and $L'$ the values of the inductor elements and $C$ and $C'$ the values of the respective capacitor elements, and the resistor element of the load impedance having a value substantially equal to the sum of the values of the resistor element of the cathode impedance and the transresistance of the tube, the load impedance circuit and the cathode impedance circuit each having a resonant frequency value of at least 3.2 times the maximum frequency of said predetermined frequency range.

EDOUARD LABIN.